(12) United States Patent
Kammel et al.

(10) Patent No.: US 6,997,614 B2
(45) Date of Patent: Feb. 14, 2006

(54) ELASTIC RUBBER BEARING

(75) Inventors: Helmut Kammel, Damme (DE); Bernd Kümper, Rahden (DE); Axel Sichler, Westerkappeln (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 45 days.

(21) Appl. No.: 10/855,090

(22) Filed: May 27, 2004

(65) Prior Publication Data

US 2004/0213491 A1 Oct. 28, 2004

Related U.S. Application Data

(63) Continuation of application No. PCT/DE03/02964, filed on Sep. 5, 2003.

(30) Foreign Application Priority Data

Sep. 6, 2002 (DE) ................. 102 41 246

(51) Int. Cl.
*F16C 27/06* (2006.01)
*F16C 17/00* (2006.01)
*F16C 33/02* (2006.01)

(52) U.S. Cl. ............... 384/222; 384/221; 384/275; 384/282; 384/582

(58) Field of Classification Search .......... 384/222, 384/215, 216, 226, 221, 235, 275, 276, 282, 384/362, 581, 582
See application file for complete search history.

(56) References Cited

U.S. PATENT DOCUMENTS

| 2,608,751 | A | * | 9/1952 | Hutton ............... 29/898.055 |
| 2,851,314 | A | * | 9/1958 | Thomson ............... 384/222 |
| 3,781,073 | A | * | 12/1973 | Jorn et al. ............... 384/291 |
| 4,491,429 | A | | 1/1985 | Matoba et al. |
| 4,667,943 | A | | 5/1987 | Izumi et al. |
| 4,744,677 | A | * | 5/1988 | Tanaka et al. ............. 384/222 |
| 4,809,960 | A | * | 3/1989 | Kakimoto et al. ......... 267/141 |
| 5,261,748 | A | * | 11/1993 | Kameda ............... 384/222 |
| 5,328,160 | A | * | 7/1994 | McLaughlin ............. 267/141.3 |
| 5,593,233 | A | * | 1/1997 | Kammel et al. ............ 384/222 |
| 5,820,115 | A | * | 10/1998 | Stevenson et al. ......... 267/293 |
| 6,485,180 | B1 | * | 11/2002 | Mena ............... 384/222 |
| 6,702,467 | B1 | * | 3/2004 | Testroet ............... 384/222 |

FOREIGN PATENT DOCUMENTS

| DE | 35 25 213 A1 | 1/1986 |
| JP | 05248466 A | 9/1993 |
| JP | 07248422 A | 9/1995 |
| JP | 08219210 | 8/1996 |
| JP | 09060675 | 3/1997 |

* cited by examiner

*Primary Examiner*—David Fenstermacher
*Assistant Examiner*—Colby Hansen
(74) *Attorney, Agent, or Firm*—McGlew and Tuttle, P.C.

(57) ABSTRACT

An elastic rubber bearing is provided with an intermediate tube, namely, a bush bearing with a reinforcing insert arranged in the elastomeric bearing body. The design of the bearing includes a pretension, which is distributed as uniformly as possible both in relation to the circumference and in the axial direction. The pretension is generated in the elastomer in a bearing body after the vulcanization by calibrating the outer sleeve. A reinforcing element of the bearing includes an intermediate tube slotted on two sides in relation to its axial extension.

20 Claims, 5 Drawing Sheets

ELASTIC RUBBER BEARING

CROSS REFERENCE TO RELATED APPLICATION

This is a continuation of and claims the benefit (35 U.S.C. §120 and 365(c)) of copending International Application PCT/DE 03/02964 of Sep. 5, 2003, which designated inter alia the United States and which claims the priority of German Application DE 10241246.4 of Sep. 6, 2002. The entire contents of each application is hereby incorporated by reference in its entirety.

FIELD OF THE INVENTION

The present invention pertains to an elastic rubber bearing with an intermediate tube, namely, a bush bearing with a reinforcing insert arranged in the elastomeric bearing body.

BACKGROUND OF THE INVENTION

Rubber bearings of the bush type, which are used, for example, in the automobile industry for mounting the components of the wheel suspension, for example, the suspension arms, comprise essentially a mostly hollow cylindrical, usually metallic inner part, an outer sleeve surrounding this inner part and an elastomeric bearing body, which is located in between and is connected to the inner part and the outer sleeve by vulcanization.

To affect the damping behavior, the so-called characteristic, it is, moreover, known that an additional reinforcing element is arranged in the elastomeric bearing body in bearings of this kind. The ratio of the radial characteristic to the torsional characteristic can be increased or the torsional characteristic can be reduced by means of this usually tubular reinforcing element, which consists mostly of a hard plastic or metal. A bush bearing with a tubular reinforcing element (intermediate tube) inserted into the elastomer is disclosed, e.g., in JP 07248422.

To obtain a bearing with good damping properties and especially long service life, it is necessary to generate a certain pretension in the elastomeric bearing body. This is achieved, in general, by reducing the diameter of the outer sleeve. However, without further measures, the reduction of the external sleeve diameter affects essentially only the area between the outer sleeve and the intermediate tube in bearings with a tubular reinforcing element. However, it is necessary for the reasons mentioned to generate a corresponding pretension, this may be done possibly as early as during the course of the manufacture, between the inner part and the reinforcing element inserted as an intermediate part as well. This is currently achieved in practice, e.g., by expanding the cylindrical inner part after the assembly of the bearing. However, this involves an additional step, which leads to extra costs. In addition, the fact that it is not possible to use high-strength materials for the insert part in this procedure can be considered to be disadvantageous.

A bush bearing of this type with a slotted intermediate tube is known from JP 08219210. It is possible due to this design to generate the pretension between the inner part and the intermediate tube as well as the pretension between the intermediate tube and the outer sleeve by calibration, i.e., by reducing the diameter of the outer sleeve. It is thus unnecessary to expand the inner part. According to that document (JP 08219210), the intermediate tube is either slotted through axially, or it has two longitudinal slots extending from a front side of the part over about ⅔ of its axial extension. The fact that the pretension that may be produced is not distributed uniformly over the circumference of the bearing body can be considered to be disadvantageous in the first-named embodiment with a through longitudinal slot. It would be possible to avoid this drawback by means of a plurality of slots distributed over the circumference. However, the reinforcing element would now consist of a plurality of parts, which would make it markedly more difficult to insert these parts into the injection mold for pouring with the elastomer. To avoid this, the second embodiment described in the document (JP 08219210) has two slots, which are located opposite each other on the circumference and start from a front side of the part, but are not through slots. Even though a more uniform pretension is thus achieved in relation to the circumference of the bearing body, this leads to the drawback that the pretension is not distributed uniformly in relation to the axial extension.

SUMMARY OF THE INVENTION

The object of the present invention is to design and provide a bearing of this type such that it can be assembled in a simple manner for the pouring during the manufacture and its parts can be inserted into the corresponding mold in a simple manner, and a pretension, which is distributed as uniformly as possible in relation to the circumference and in the axial direction, can be generated in the elastomer in its bearing body after the vulcanization by calibrating (reducing the diameter) of the outer sleeve.

According to the invention an elastic rubber bearing is designed as a bush bearing, with an essentially cylindrical inner part, an outer sleeve surrounding same and with an elastomeric bearing body, which is located in between and is connected to the inner part and the sleeve by vulcanization. A reinforcing element is arranged in the bearing body, which said reinforcing element is designed as an intermediate tube in relation to the inner part as well as the outer sleeve with at least two nonthrough longitudinal slots, which are arranged distributed on the circumference of the intermediate tube and extend essentially in the axial direction. The intermediate tube is slotted on two sides in relation to its axial extension, so that the longitudinal slots, which are open toward the two axial ends of the intermediate tube, start from the two axial ends of the intermediate tube. The longitudinal slots extend in the direction of the, respective other axial end and extend at least to the axial middle of the intermediate tube.

The tubular reinforcing element, which has at least two longitudinal slots, which are arranged on its circumference, extend essentially in the axial direction and are not through slots, is arranged in the bearing body in the elastic rubber bearing according to the present invention. The bearing is designed as a bush bearing and comprises an essentially cylindrical (mostly hollow cylindrical) inner part, an outer sleeve surrounding same and an elastomeric bearing body, which is located between them and is connected to the inner part and the sleeve by vulcanization. However, unlike in the state of the art, the intermediate tube is slotted according to the present invention on two sides in relation to its axial extension. At least one longitudinal slot starts from each of the two axial ends of the intermediate tube, and the longitudinal slot is open towards that end and extends in the direction of the respective other end. As was described above, the longitudinal slots are not through slots axially, but they extend at least to the middle of the intermediate tube in relation to the axial direction. Due to the distribution of the longitudinal slots on the circumference of the intermediate tube as well as in relation to the axial extension of the intermediate tube, it is possible to build up a highly uniform pretension in relation to both the circumference and the axial extension of the bearing in the elastomer even in the area of the elastomer located radially between the reinforcing element and the inner part solely by reducing the diameter of the outer sleeve. The compression of the rubber brought about by means of the calibration of the outer sleeve leads to a high radial rigidity of the elastomeric bearing body, which is nearly uniform over the entire circumference. The ratio of the radial characteristic to the torsional characteristic is increased and the radial load-bearing capacity is thus increased. The radial load-bearing capacity, which is nearly equal over the entire circumference, increases the service life of the bearing. Due to the torsional stiffness, which is lower in comparison thereto, the driving characteristic of the vehicles is improved when the bearing according to the present invention is used in the area of the wheel suspension of vehicles. Due to the fact that expansion of the inner part to generate the pretension is not necessary, high-strength materials can be used for this. As a result, the stability of the inner part is increased, which likewise has a favorable effect on the service life of the entire bush bearing. In addition, the manufacturing costs decrease due to the elimination of a step after the assembly of the bearing and the vulcanization thereof.

The advantages described are especially marked when the longitudinal slots are mutually open toward the axial ends of the intermediate tube, i.e., when longitudinal slots arranged adjacent to each other are open at respective opposite axial ends of the intermediate tube in relation to the circumference of the intermediate tube. In addition, the longitudinal slots are advantageously arranged uniformly on the circumference of the intermediate tube, i.e., they have equal distances from each other at least in the area of the axial ends of the intermediate tube.

Corresponding to a preferred embodiment, the longitudinal slots extend, moreover, in parallel to one another and to the central axis of the bearing.

As was already described above, the longitudinal slots extend, starting from the respective axial end of the intermediate tube, in the axial direction in relation to one another up to the middle of the intermediate tube. However, it proved to be favorable for the longitudinal slots to extend beyond the axial middle, but, of course, nevertheless not throughout, so that the longitudinal slots starting from the opposite axial ends overlap in terms of their axial extension. The longitudinal slots, which are opened to an axial end of the intermediate tube and are separated from the respective other axial end by a web, now form two structures engaging each other in a comb-like manner.

In an especially preferred embodiment of the bearing according to the present invention, the intermediate tube and the longitudinal slot formed therein are dimensioned such that the ratio of the height of a web separating the particular slot from an axial end of the intermediate tube to the overall axial length of the intermediate tube corresponds to the ratio of the width of the corresponding slot to the diameter of the intermediate tube. Corresponding to this design, especially good conditions are obtained in regard to the possibility of calibration by means of the reduction of the diameter of the outer sleeve and the uniform distribution of the pretension built up as a result in the elastomer.

In addition, corresponding to a possible variant of the present invention, the intermediate tube may have additional recesses, which are distributed on its jacket surface next to the slots, but which are closed toward both axial ends. These act as flow openings, which facilitate the flow of the elastomer during the vulcanization.

Depending on the intended use of the bearing, a flange may be provided, moreover, at one axial end or at both axial ends of the intermediate tube, and the longitudinal slot starting from the corresponding axial end passes through the flange. The flange may have an annular shape that is closed in itself or be divided into segments by the longitudinal slots.

Corresponding to another advantageous embodiment, the intermediate tube has elevations arranged on the circumference, which are distributed in the area of the axial ends (front area). These elevations may be formed on both the outer jacket surface and the inner surface of the intermediate tube or even on both surfaces. In order to guarantee the function of the elastomer, these elevations are formed, however, only in the front area. Optimal insertion of the intermediate tube or of the intermediate sleeve into the injection mold is facilitated by the elevations, and the introduction of the elastomer is thus improved. The formation of such elevations on the mold itself, by which corresponding elevations or depressions are formed on the rubber contour, represents a means having the same action. Depending on the intended use and the requirements arising therefrom, the intermediate tube of the bearing may be made of steel, aluminum or a high-strength plastic.

The bush bearing according to the present invention is preferably designed as a prefabricated assembly unit, for which calibration is very largely dispensable (e.g., without reducing the diameter of the outer sleeve or substantially without reducing the diameter of the outer sleeve) during its installation into a bearing seat (or mount of the components of the wheel suspension, for example, the suspension arms) as intended.

The present invention will be explained in greater detail below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
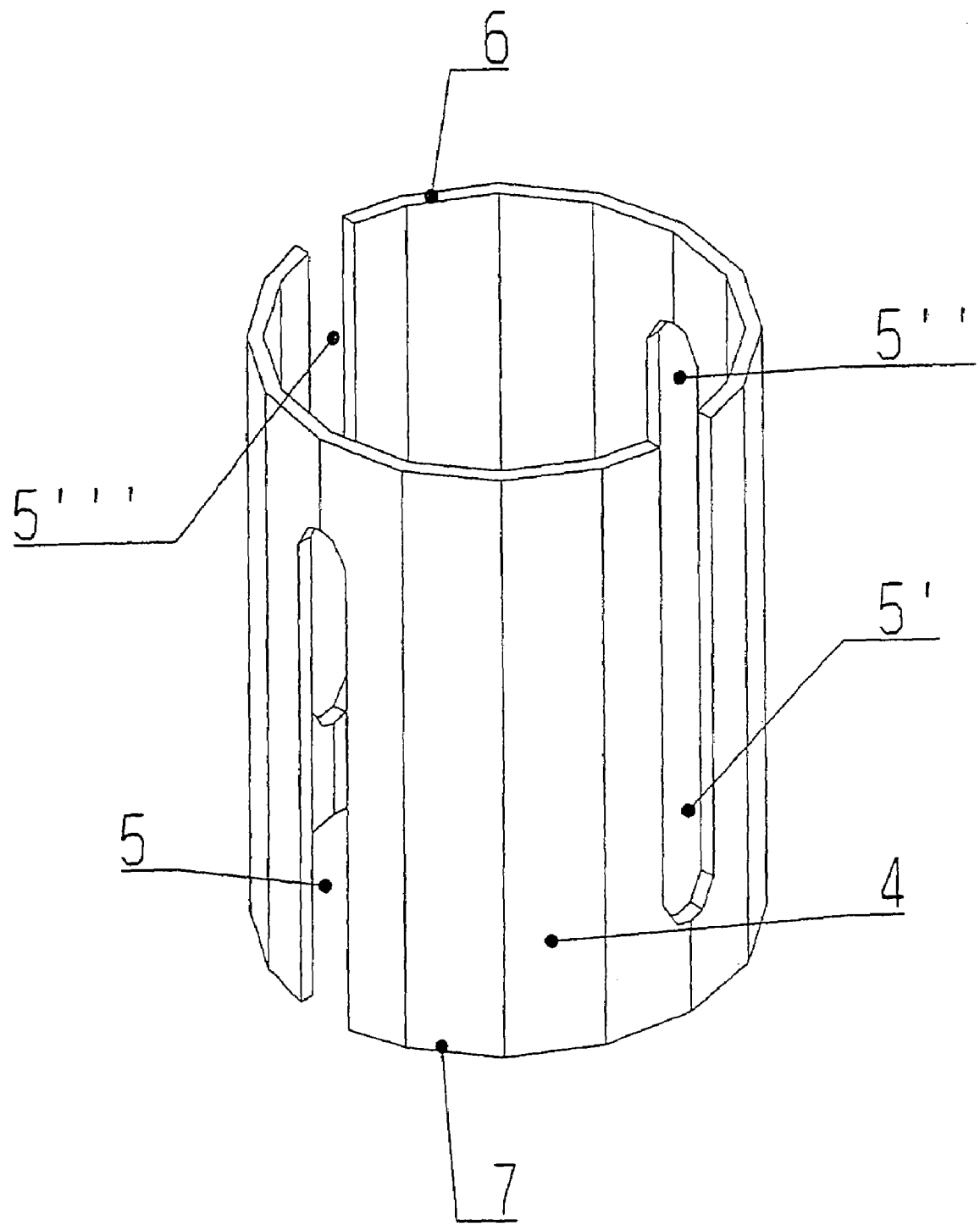
FIG. 1 is a perspective view of an exemplary embodiment of an intermediate tube of a bearing according to the present invention.

FIG. 1 shows as an example a possible embodiment of the intermediate tube 4 for the rubber bush bearing according to the present invention. The reinforcing element 4, which consists, in general, of steel plate, has the shape of a hollow cylinder, in which four longitudinal slots 5, 5', 5'', 5''', offset by 90° each in relation to one another, are prepared uniformly distributed over its circumference. The axially nonthrough longitudinal slots 5, 5', 5", 5''' are designed according to the present invention such that the intermediate tube 4 is slotted on both sides in relation to its axial extension. The longitudinal slots 5, 5, 5", 5''' start alternatingly at one of the two axial front sides 6, 7 of the intermediate tube 4 in the example being shown. The longitudinal slots 5, 5', 5", 5''' extend in parallel to one another and to the longitudinal axis 8 of the reinforcing element 4, which longitudinal axis is not shown in FIG. 1.

Figure 2:
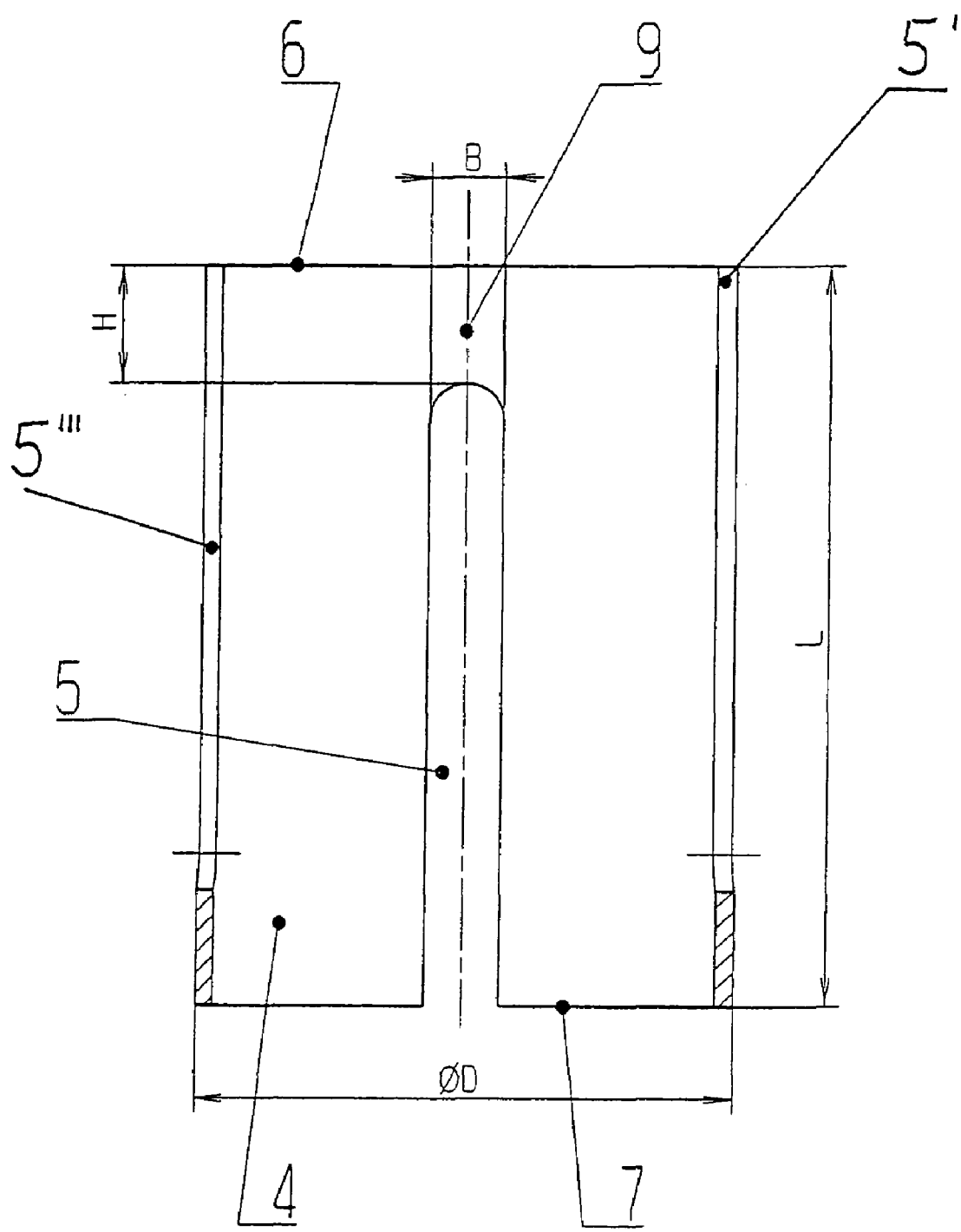
FIG. 2 is a sectional view of the intermediate tube according to FIG. 1.

The length of the slots 5, 5', 5", 5''', which are open to an axial end 6 of the part, is preferably selected to be such that the ratio of the height H of the web 9 separating the slot 5, 5', 5", 5''' from the respective other axial end 7 of the intermediate tube to the overall axial length L of the intermediate tube 4 is the same as the ratio of the width B of the corresponding longitudinal slot 5, 5', 5", 5''' to the diameter D of the intermediate tube 4. This embodiment, which is preferred concerning the dimensions, is illustrated once again in a sectional view in FIG. 2. FIG. 2 shows the reinforcing element 4 according to FIG. 1 in a view with a section through the element in the axial direction. With otherwise equal dimensions, the two longitudinal slots 5', 5''' arranged on the circumference adjacent to the slot 5 recognizable from FIG. 2 extend, beginning from the opposite axial front side 6 of the cylindrical element or intermediate tube 4, in the axial direction (cf. FIG. 1).

Figure 3:
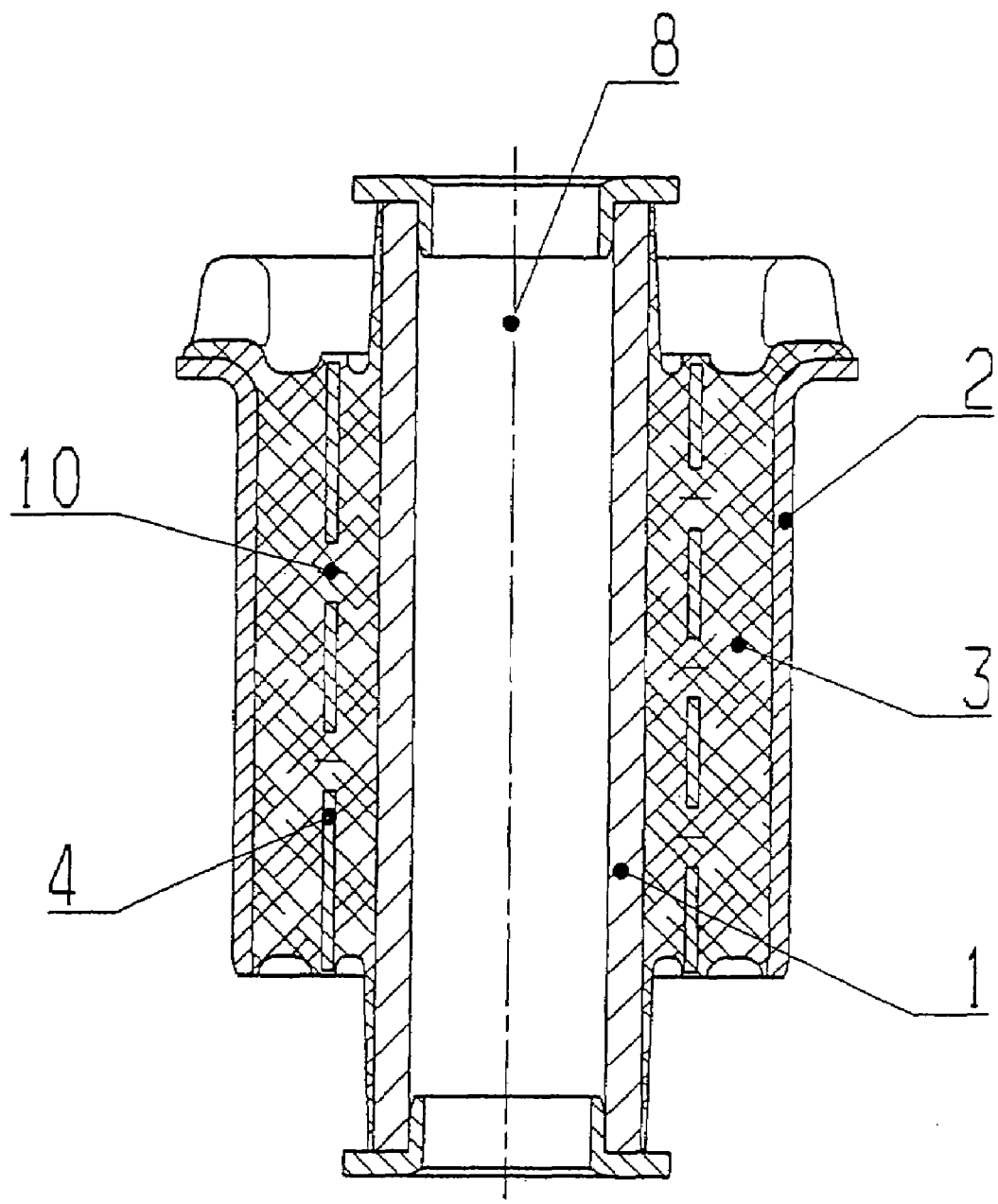
FIG. 3 is a bush bearing according to the present invention with an intermediate tube arranged therein.

The reinforcing element 4 designed in this way may additionally also have a plurality of recesses 10 distributed on its circumference. These so-called flow openings or holes 10, not shown in FIGS. 1 and 2, facilitate the flow of the elastomer during the injection molding. FIG. 3 shows a sectional view of the bearing according to the present invention with the intermediate tube 4 inserted therein. The bearing comprises the inner part 1, an outer sleeve 2 arranged around the inner part and the elastomeric bearing body 3 arranged in between. The reinforcing element 4 with the longitudinal slots 5, 5', 5", 5''', which reinforcing element has the above-mentioned flow holes 10 according to the example shown in FIG. 3, is vulcanized into the elastomeric bearing body 3.

Figure 4:
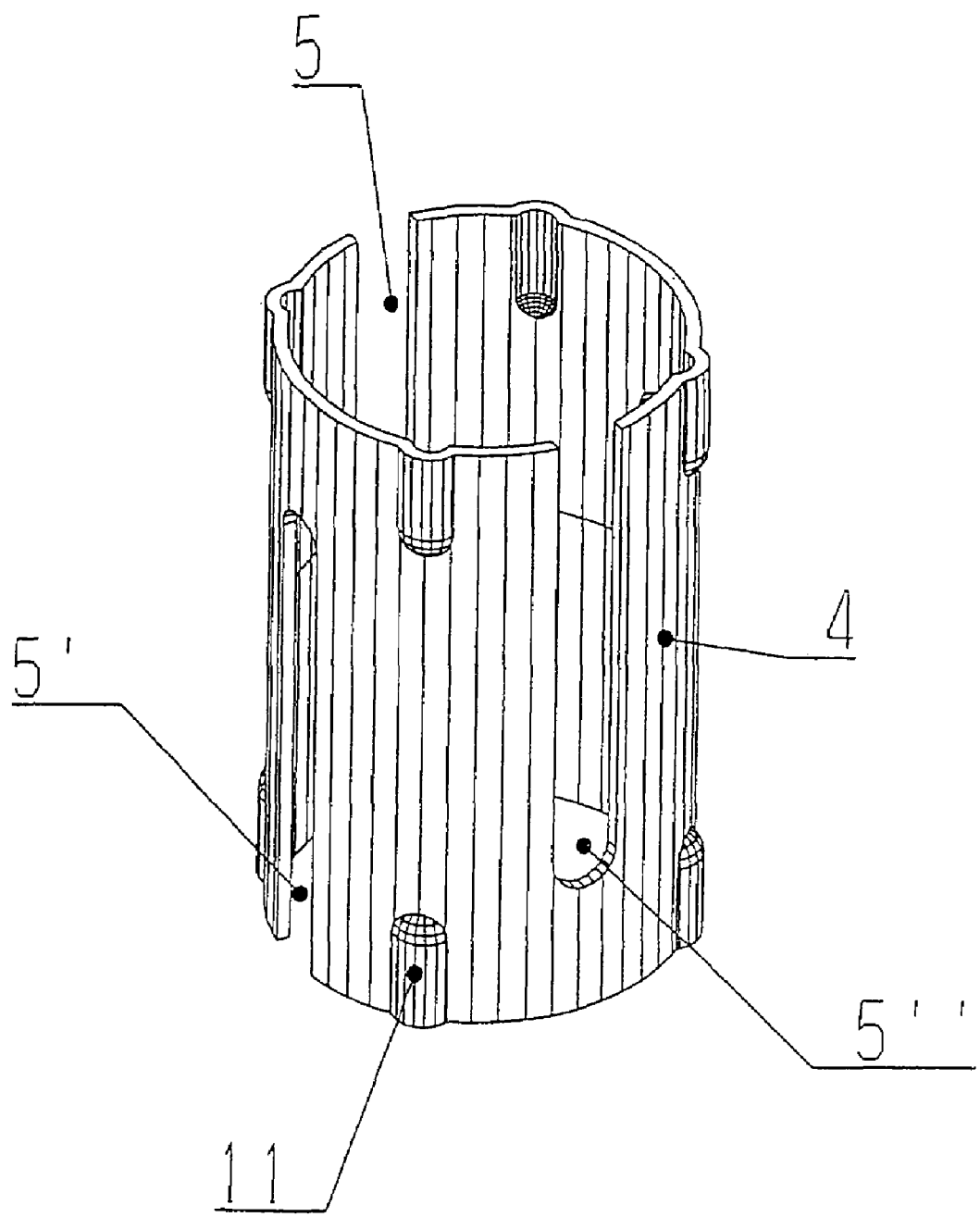
FIG. 4 is a modification of the intermediate tube according to FIG. 1.

FIG. 4 shows a modified form of the intermediate tube 4 according to FIG. 1. The intermediate tube 4 shown in the example has elevations 11, which are arranged distributed on the circumference and are distributed on its jacket surface in the area of the two axial ends 6, 7. Optimal insertion of the intermediate tube 4 into the injection mold for assembling the bearing by introducing the elastomer between the inner part 1 and the outer sleeve 2 is facilitated by these elevations 11, which do not extend over the entire axial length of the component. The elevations 11 act at the same time as a guide and spacer, so that the longitudinal slots 5, 5', 5", 5''' of the intermediate tube 4 do not come into contact with the wall of the injection mold.

Figure 5:
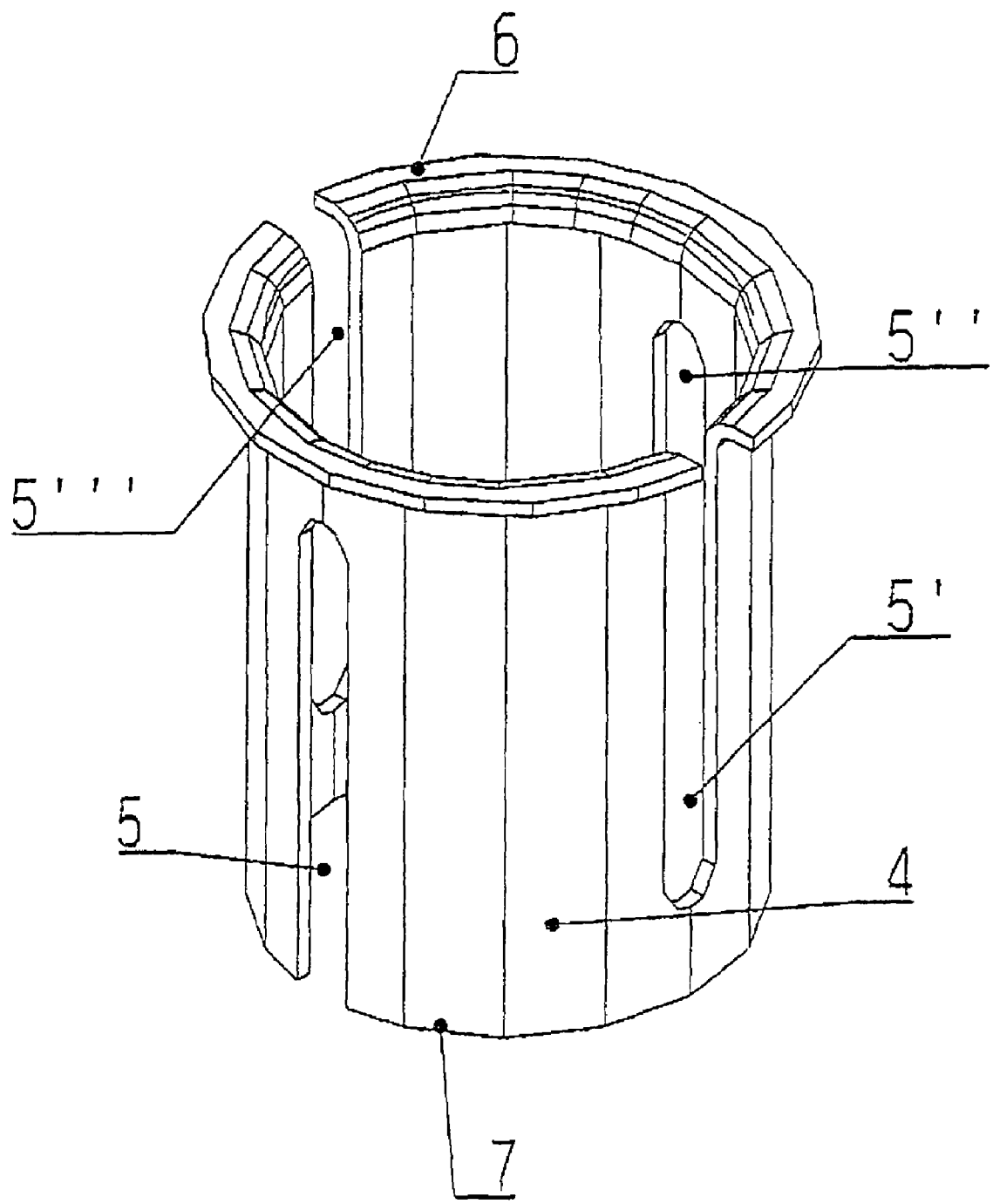
FIG. 5 is an intermediate tube with a flange formed on one side.

FIG. 5 shows, moreover, a perspective view of an intermediate tube 4 as an individual part, on which said intermediate tube a flange is formed at its axial end 6, the flange extending radially in its outer circumference. The longitudinal slots 5' and 5''' pass through the flange in this example. The opposite axial end 7 of the intermediate tube 4 has no flange.

The intermediate tube 4 of each of FIGS. 4 and 5 may be provided inserted into the bearing according to FIG. 3 instead of the intermediate tube 4 shown. Further, the intermediate tube 4 of each of FIGS. 4 and 5 may have the above-mentioned flow holes 10 according to the example shown in FIG. 3.

While specific embodiments of the invention have been shown and described in detail to illustrate the application of the principles of the invention, it will be understood that the invention may be embodied otherwise without departing from such principles.

What is claimed is:

1. An elastic rubber bush bearing, comprising:
an essentially cylindrical inner part;
an outer sleeve surrounding said inner part;
an elastomeric bearing body located in between said outer sleeve and said inner part, said elastomeric bearing body being connected to said inner part and to said sleeve by vulcanization;
a reinforcing element arranged in the bearing body, said reinforcing element being provided as an intermediate tube in relation to said inner part and said outer sleeve, said reinforcing element having at least two longitudinal slots arranged distributed on the circumference of the intermediate tube and extending essentially in the axial direction with at least one of said longitudinal slots open toward one of two axial ends of the intermediate tube and at least another of said longitudinal slots open toward another of the two axial ends of the intermediate tub, and each of said respective longitudinal slots starting from the respective axial ends of the intermediate tube and extending in a direction of the respective other axial end to a slot end, spaced from said respective other axial end and at least beyond an axial middle of the intermediate tube, said intermediate tube further having elevation regions arranged distributed on the circumference, each of said elevation regions defining an axially extending jacket surface portion extending along a length of said intermediate tube to one of said axial ends with circumferentially spaced apart elevation regions extending respectively to each of said axial ends and with each said jacket surface portion being radially outwardly of an adjacent jacket region of said intermediate tube and an axial end of said jacket surface portion being radially outwardly of a remaining adjacent axial end thereof.

2. An elastic rubber bearing in accordance with claim 1, wherein plural said longitudinal slots are mutually open to each of said axial ends of the intermediate tube, so that said longitudinal slots arranged adjacent to one another in relation to the circumference of the intermediate tube are open toward the opposite axial ends of the intermediate tube.

3. An elastic rubber bearing in accordance with claim 1, wherein plural said longitudinal slots are arranged in a uniform distribution in relation to the circumference of the intermediate tube at equal distances from one another at least in the area of the axial ends of the intermediate tube.

4. An elastic rubber bearing in accordance with claim 1, wherein said longitudinal slots extend in parallel to one another and to a central axis of the bearing.

5. An elastic rubber bearing in accordance with claim 1, wherein the longitudinal slots overlap in terms of their axial extension, so that the longitudinal slots which are open to an axial end of the intermediate tube and are separated from the respective other axial end by a web, form two structures engaging one another in a comb-like manner.

6. An elastic rubber bearing in accordance with claim 5, wherein said intermediate tube and the longitudinal slots prepared therein are dimensioned such that the ratio of the height H of a web separating the respective slot from a respective axial end of said intermediate tube to an overall axial length L of the intermediate tube is the same as the ratio of the width B of the corresponding longitudinal slot to the diameter D of said intermediate tube.

7. An elastic rubber bearing in accordance with claim 1, wherein said intermediate tube further has through holes extending through a surface of said intermediate tube, each of said through holes being defined by hole edges spaced axially from said axial ends with said through holes being distributed over a jacket surface area of said intermediate tube to form flow openings for the passage of elastomer therethrough during the vulcanization.

8. An elastic rubber bearing in accordance with claim 1, wherein said elevations are formed on the outer jacket surface and/or on the inner surface of the intermediate tube.

9. An elastic rubber bearing in accordance with claim 1, wherein said intermediate tube consists essentially of one or more of steel, aluminum or plastic.

10. An elastic rubber bearing in accordance with claim 1, wherein said bearing is formed as a prefabricated assembly unit, for which calibration is very largely dispensable during its installation as intended.

11. An elastic rubber bearing in accordance with claim 1, wherein each of said elevations is spaced a circumferential distance from an adjacent slot.

12. An elastic rubber bearing in accordance with claim 1, wherein said longitudinal slots each have a constant width from an axial end to a closed end area.

13. A bearing, comprising:
an essentially cylindrical inner part;
an outer sleeve surrounding said inner part;
an elastomeric bearing body located in between said outer sleeve and said inner part, said elastomeric bearing body being connected to said inner part and to said sleeve by vulcanization;
a reinforcing element arranged in the bearing body, said reinforcing element being provided as an intermediate tube in relation to said inner part and said outer sleeve, said reinforcing element having first longitudinal slots extending substantially axially from a first end of said intermediate tube to a location beyond an axial middle of said intermediate tube and spaced from a second end of said intermediate tube and second longitudinal slots extending substantially axially from said second end of said intermediate tube to a location beyond an axial middle of said intermediate tube and spaced from said first end of said intermediate tube, said intermediate tube further having first end elevation regions defined on the circumference of said intermediate tube, said first end elevation regions each extending axially along a length of said intermediate tube to said first axial end, said first end elevation regions each being radially outwardly of an adjacent surface region of said intermediate tube and each having an axial end radially outwardly of a remaining adjacent first axial end of said intermediate tube and said intermediate tube having second end elevation regions defined on the circumference of said intermediate tube, said second end elevation regions each extending axially along a length of said intermediate tube to said second axial end, said second end elevation regions each being radially outwardly of an adjacent surface region of said intermediate tube and each having an axial end radially outwardly of a remaining adjacent second axial end of said intermediate tube.

14. A bearing in accordance with claim 13, wherein said first longitudinal slots and said second longitudinal slots are arranged in a uniform distribution in relation to the circumference of the intermediate tube at equal distances from one another at least in the area of the axial ends of the intermediate tube.

15. A bearing in accordance with claim 13, wherein said first longitudinal slots and said second longitudinal slots extend in parallel to one another and in parallel to a central axis of the bearing.

16. A bearing in accordance with claim 13, wherein said first longitudinal slots and said second longitudinal slots overlap in terms of their axial extension, so that said first longitudinal slots and said second longitudinal slots are open to an axial end of the intermediate tube and are separated from the respective other axial end by a web to form two structures engaging one another in a comb-like manner.

17. A bearing in accordance with claim 13, wherein said intermediate tube and the first longitudinal slots and said second longitudinal slots prepared therein are dimensioned such that the ratio of the height H of a web separating the respective slot from a respective axial end of said intermediate tube to an overall axial length L of the intermediate tube is the same as the ratio of the width B of the corresponding longitudinal slot to the diameter D of said intermediate tube.

18. An elastic rubber bearing in accordance with claim 1, wherein said intermediate tube further has through holes extending through a surface of said intermediate tube, each of said through holes being defined by hole edges spaced axially from said axial ends with said through holes being distributed over a jacket surface area of said intermediate tube to form flow openings for the passage of elastomer therethrough during the vulcanization.

19. An elastic rubber bearing in accordance with claim 13, wherein each of said elevations is spaced a circumferential distance from an adjacent longitudinal slot and each of said longitudinal slots have a width that is substantially constant over an axial length thereof up to an axial end to a closed end area.

20. A bush bearing, comprising:
an essentially cylindrical inner part;
an outer sleeve surrounding said inner part;
an elastomeric bearing body located in between said outer sleeve and said inner part, said elastomeric bearing body being connected to said inner part and to said sleeve by vulcanization;
a reinforcing element arranged in the bearing body, said reinforcing element being provided as an intermediate tube in relation to said inner part and said outer sleeve, said reinforcing element having first longitudinal slots extending substantially axially from a first end of said intermediate tube to a location beyond an axial middle of said intermediate tube and spaced from a second end of said intermediate tube and second longitudinal slots extending substantially axially from said second end of said intermediate tube to a location beyond an axial middle of said intermediate tube and spaced from said first end of said intermediate tube with each of said first longitudinal slots being respectively arranged between adjacent second longitudinal slots in relation to the circumference of the intermediate tube such that adjacent longitudinal slots open to opposite axial ends and with adjacent longitudinal slots overlapping in terms of their axial extension, each of said longitudinal slots being dimensioned such that a ratio of a height (H) of a web separating and spacing the respective slot from a respective axial end of said intermediate tube to an overall axial length (L) of the intermediate tube is the same as the ratio of the width (B) of the corresponding longitudinal slot to the diameter (D) of said intermediate tube, wherein said slots form two pairs of slots and the reinforcing element is substantially symmetrical, and wherein said intermediate tube further comprises:

first end expanded regions arranged distributed on the circumference of said intermediate tube spaced from each other and spaced from said first longitudinal slots, with each of said first end expanded regions defining an axially extending first axial end surface portion, extending along a length of said intermediate tube to said first axial end, each of said first end expanded regions being radially outwardly of an adjacent surface region of said intermediate tube having an axial end radially outwardly of a remaining adjacent first axial end of said intermediate tube; and second end expanded regions arranged distributed on the circumference of said intermediate tube and spaced from each other and spaced from said second longitudinal slots, with each of said second end expanded regions defining an axially extending second axial end, each of said second end expanded regions being radially outwardly of an adjacent surface region of said intermediate tube and having an axial end radially outwardly of a remaining adjacent second axial end of said intermediate tube.

* * * * *